March 21, 1967  R. E. BONNEY  3,310,276
MOLD HOLDER ASSEMBLY FOR MOUNTING IN A MOLDING APPARATUS
Filed Feb. 25, 1964  2 Sheets-Sheet 1

Robert E. Bonney
INVENTOR.

March 21, 1967  R. E. BONNEY  3,310,276
MOLD HOLDER ASSEMBLY FOR MOUNTING IN A MOLDING APPARATUS
Filed Feb. 25, 1964  2 Sheets-Sheet 2
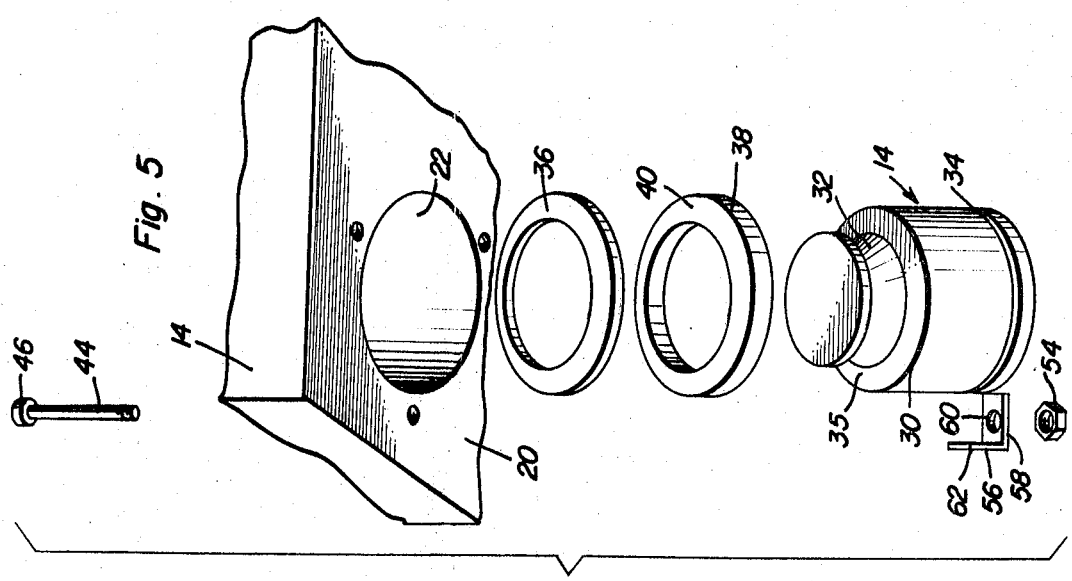
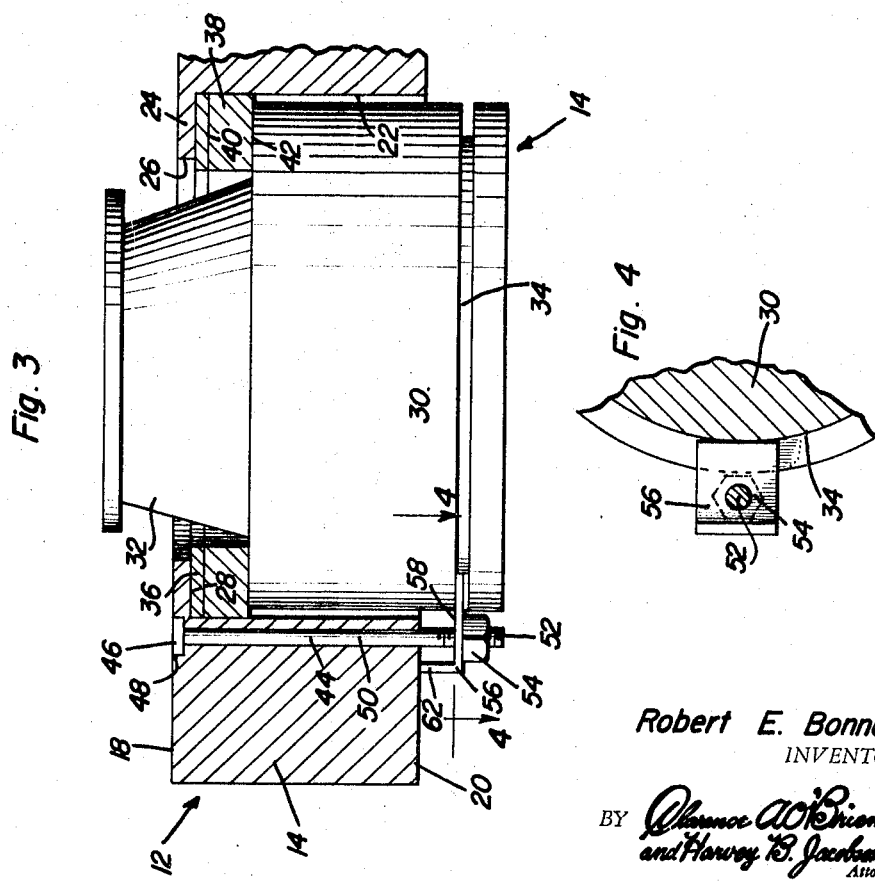
Robert E. Bonney
INVENTOR.

United States Patent Office 3,310,276
Patented Mar. 21, 1967

3,310,276
MOLD HOLDER ASSEMBLY FOR MOUNTING IN
A MOLDING APPARATUS
Robert E. Bonney, Carlsbad, N. Mex., assignor of five percent to Tom R. Caviness, five percent to Clifton S. Bailey, and five percent to E. C. Paine
Filed Feb. 25, 1964, Ser. No. 347,192
12 Claims. (Cl. 249—120)

This invention comprises a novel and useful mold holding device and more particularly pertains to a mold holder assembly for detachably and interchangeably mounting a series of molds for use in a multiple mold apparatus.

It is the primary purpose of this invention to provide a mold holder assembly which may be employed in conventional molding machines and which will facilitate the use interchangeably of different molds in the same apparatus.

A further object of the invention is to provide a mold holding device in accordance with the preceding objects which will enable the interchangeable use of molds of different sizes and different configurations upon the same machine.

Another important object of the invention is to provide a mold holding assembly of the maximum simplicity and ease of handling and which will greatly reduce the downtime normally required for changing or removing molds from the machine as may be necessary for maintenance, changing of mold sizes and the like.

Still another object of the invention is to provide a mold holding device in accordance with the preceding objects wherein the molds shall be compactly and securely retained within cavities in the mold holder itself with an improved anchoring or retaining means to facilitate the removal of, installation of or the interchanging of molds.

Still another purpose of the invention is to provide an apparatus in accordance with the foregoing objects wherein the chambers in the mold holder receiving the molds shall be provided with an annular internal and inwardly projecting surface comprising a seat for detachably receiving molds or mold spacing shims or elements therebetween.

A further and more specific object of the invention is to provide a device including mold receiving chambers within a mold holder which chamber shall be sufficiently larger than the largest mold to facilitate its insertion or removal and wherein the mold-receiving chamber shall include a radially inwardly projecting lip at its upper end projecting a sufficient distance into the mold chamber to securing anchor or clamp on the smallest mold employed with the device.

A still further purpose of the invention is to provide a mold holder in accordance with the foregoing objects which will enable the use of a heat insulating shim or gasket between the mold and its seat in the mold receiving chamber to thereby reduce the rate of heat transfer to a mold holding device from the molds as well as to provide a cushion for the mold when the latter is clamped to the mold holding device.

And a final important object of the invention to be specifically enumerated herein resides in the provision of a device in accordance with the preceding objects which shall provide mold receiving chambers wherein the molds which are disposed in a substantially completely recessed manner thereby reducing to a minimum the projection of the molds below the mold holder and thereby eliminating the necessity for changing the stroke on the opening or closing mechanism of the mold even though various sizes of molds are interchangeably employed in the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a detail view, taken upon an enlarged scale in vertical longitudinal section substantially upon the plane indicated by the section line 3—3 of FIGURE 2 and through the structure for securing and retaining one of the female molds in a detachable manner in the mold holder assembly of this invention;

FIGURE 4 is a detail view in horizontal section taken substantially upon the plane indicated by the section line 4—4 of FIGURE 3 and showing in particular one of the fasteners by which the female mold is attachably secured and clamped in the mold holding device; and FIGURE 5 is an exploded perspective view of a portion of the mold holder, one of the female molds and the associated mold-holding structure therefor.

Figure 1:
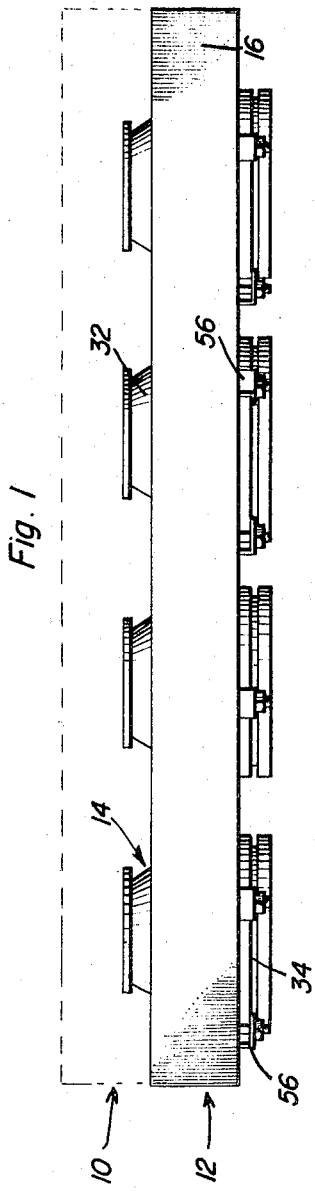
FIGURE 1 is a side elevational view of one suitable embodiment of the mold holding device of this invention.

The present invention relates to a mold holder of a multiple mold apparatus of the conventional-type having a relatively movable upper mold section cooperating with a lower stationary mold section. The structural details of the two mold sections and their operating means form in themselves no part of this invention. In FIGURE 1 the numeral 10 indicates generally in phantom a portion of a conventional movable upper mold section upon which is mounted the mold holder assembly of this invention designated generally by the numeral 12 and which may form either a detachable component or may constitute a part of the upper mold section 10. The upper mold section removably supports a plurality of interchangeable upper or female molds each indicated generally by the numeral 14. It is the mounting by which the female molds 14 are secured in the mold section 12 for ready removability and interchangeability therewith which constitutes the essence of this invention.

The mold holder assembly includes a block-like body 16 which is preferably rectangular in cross-section and in plan and which includes as shown best in FIGURE 3 planar top and bottom surfaces as at 18 and 20. A plurality of mold-receiving chambers or bores 22 extend vertically through the mold holder 14 and through the top and bottom surfaces 18 and 20 thereof. Any desired number and arrangement of these chambers may be provided, four such chambers being shown in FIGURE 2.

At the upper end of these chambers 22 the top surface 18 of the body 14 is provided with a radially inwardly projecting portion 24 comprising an annular lip or flange having a central opening 26 therethrough which is of a reduced diameter compared to that of the chamber 22. The inner or underside of this flange 24 is provided with an annular surface as at 28 constituting the shouldered surface or seat within the chamber 22 which seats or limits inward travel of the mold 14 thereinto.

The mold 14 is of any desired character including a main body portion 30 together with a diametrically reduced generally conical and upwardly convergent neck 32. As will be seen best from FIGURE 3, this neck projects upwardly and is loosely received in the opening 26 in the flange or lip 24 so that the upper portion of the female mold 14 projects above the top surface 18. The main or body portion 30 of the mold projects slightly below the bottom surface 20 and cooperates with complemental male molds, not shown, which are carried by the lower or stationary mold frame section. The lower portion of the main body section of the mold projects downwardly below the bottom surface 20 and is provided with a circumferentially extending groove 34. This groove may consist of a single continuous peripheral channel or recess about the exterior surface of the mold as shown or may consist of one or more short circumferentially extending grooves if desired. The groove 34 comprises part of a securing and retaining means by which the molds 14 are detachably and interchangeably secured in the mold chamber 22 of the mold holder 14.

As will be observed by reference to FIGURES 3 and 5, the top surface of the main body 30 of the mold 14, and its junction with the neck 32, is provided with a planar annular surface 35. In some instances, this surface may be directly placed against the seat 28 of the lip or rim 24 to thereby seat the mold in the mold-receiving chamber 22 where it will be held in a clamping engagement therewith by the fastening means to be later described. In its other instance, however, it is preferred to provide a ring or washer 36 of a heat insulating material and preferably of a yieldable nature to constitute both an insulating means and a gasket. This member serves the dual functions of reducing heat transfer from the mold to the mold holder and further serves to cushion the engagement of the mold upon its seat.

There is also provided a series of interchangeable spacers in the form of rings or annules as indicated at 38. Each of the spacers has planar top and bottom surfaces as at 40 and 42, respectively, whereby they may be engaged against the gasket or ring 36 or directed against the seat 28 and against the seating surface 36 of the mold 14. These elements provide means of different thickness which may be selectively employed to effect any desired spacing of the molds with respect to the lip 24 and thus regulate the projecting portion of the molds below the bottom surface 20. This is particularly advantageous in the case of molds having different shapes and sizes and enables them to be securely seated in proper relation in the mold holder of the upper mold section.

A retaining and securing means is provided for facilitating the detachable connection of a selected mold in the mold receiving chamber 22. Conveniently, this retaining means comprises a plurality of fastening bolts 44 whose heads 46 are preferably recessed into the recesses 48 in the top surface 18 of the mold holder 18, these bolts extending completely through vertical passages or bores 50 through the mold holder 14. At their lower ends, the bolts are threaded as at 52 and receive thereon clamping nuts 54. Cooperating with the clamping nuts are L-shaped brackets or clips as at 56 having horizontally extending legs 58 apertured as at 60 for the reception of the fastening bolts therethrough. The vertical legs 62 of these clips are adapted to abut against the bottom surface 20 of the mold body 14 to thus limit upward travel thereof, while the horizontal legs 58 as shown in FIGURE 4 are receivable in the circumferential groove 34 of the mold. Thus, by tightening these nuts 54, the molds can be drawn up into the chamber 22 and tightly clamped therein in proper position.

The mold holder also includes suitably disposed recesses or bores 70 therethrough for the purpose of orienting the position of the mold holder with the other mold section of the press. For this purpose suitable dowel pins or the like, not shown, carried by the outer section may be received in the bore openings 70.

Figure 2:
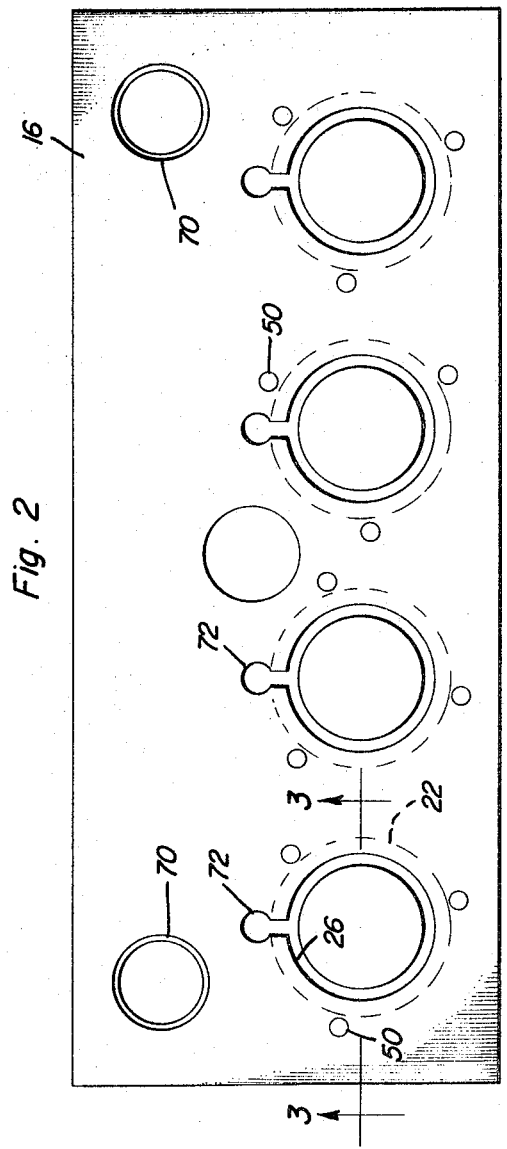
FIGURE 2 is a top plan view of the device of FIGURE 1.

Also shown in FIGURES 2 are a series of bores, holes or passages 72, one being disposed adjacent each of the molds, for the provision of a conventional ejector rod by which the mold articles may be ejected from the molds.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mold holder assembly for mounting in a molding apparatus comprising a block-like body having mold-receiving chambers therein opening upwardly from a lower surface of said body, each chamber having a mold-receiving seat therein, a plurality of molds, means detachably retaining each of said molds upon the mold-receiving seat in one of said chambers, said body having flat top and bottom surfaces and said chambers each comprising a bore extending through both said surfaces, said seat comprising an internal shouldered surface in said bore, said retaining means being disposed below said body and the bottom surface thereof and being engaged in a recess in a portion of the associated mold projecting beneath said bottom surface.

2. A mold holder assembly for mounting in a molding apparatus comprising a block-like body having mold-receiving chambers therein opening upwardly from a lower surface of said body, each chamber having a mold-receiving seat therein, a plurality of molds, means detachably retaining each of said molds upon the mold-receiving seat in one of said chamber, said retaining means being disposed below said body and the bottom surface thereof and being engaged in a recess in a portion of the associated mold projecting beneath said bottom surface.

3. The combination of claim 2 wherein said mold recess comprises a circumferentially extending groove in the exterior surface of said mold, said retaining means including a clip engaged in said groove and a fastener securing said clip to said body.

4. A mold holder assembly for mounting in a molding apparatus comprising a block-like body having mold-receiving chambers therein opening upwardly from a lower surface of said body, each chamber having a mold-receiving seat therein, a plurality of molds, means detachably retaining each of said molds upon the mold-receiving seat in one of said chamber, said body having flat top and bottom surfaces and said chambers each comprising a bore extending through both said surfaces, said seat consisting of an annular inwardly extending flange on said body at its top surface providing an internal annular shouldered surface comprising said seat, said mold having a diametrically reduced neck portion extending through said seat and top surface, and an annular adjusting spacer disposed one in each of said mold receiving chambers and surrounding said mold neck portion and interposed between said mold and seat.

5. A mold holder assembly for detachably securing interchangeable female molds comprising a block-like body having a top surface and a planar bottom surface, a plurality of bores each extending through said body and through both of said surfaces, said top surface having a radially inwardly extending portion overlying each bore and providing therein a seat having a diametrically reduced opening therethrough, a plurality of female molds each comprising a body portion loosely received in the lower portion of a bore and a diametrically reduced neck portion projecting upwardly through said opening, an interchangeable spaced ring loosely surrounding said neck portion and interposed between said seat and mold body portion, the latter projecting downwardly below said bottom surface, a fastener engaging said body and said downwardly projecting mold portion and clamping said mold body against said spacer and the latter against said seat.

6. The combination of claim 5 including orienting means in said mold holder releasably orienting it with a cooperating mold apparatus section.

7. The combination of claim 5 wherein said downwardly projecting mold portion has a circumferential groove therein, said fastener comprising a clip engageable in said groove.

8. The combination of claim 7 wherein said fastener further comprises an elongated bolt extending through said block-body adjacent the bore, the lower end of the bolt being threaded and adjustably receiving a clamping nut thereon, said clip being received on the bolt above said nut for vertical adjustment thereby.

9. A mold holder assembly for mounting in a molding apparatus comprising a block-body having at least one mold-receiving chamber therein opening upwardly from a lower surface of said body, said chamber having a mold-receiving seat therein, a mold, means detachably retaining said mold upon the mold-receiving seat in said chamber, said retaining means being disposed below said body at the bottom surface thereof and being engaged in a recess in a portion of the mold projecting beneath said bottom surface.

10. A mold holder assembly for mounting in a molding apparatus comprising a block-like body having at least one mold-receiving chamber therein opening upwardly from a lower surface of said body, said chamber having a mold-receiving seat therein, a mold, means detachably retaining said mold upon the mold-receiving seat in said chamber, said body having top and bottom surfaces, said chamber comprising a bore extending through said surfaces, said seat consisting of an annular inwardly extending flange on said body adjacent its top surface providing an internal annular shouldered surface comprising said seat, said mold having a diametrically reduced neck portion extending through said seat and top surface, and an annular adjusting spacer disposed in said mold-receiving chamber and surrounding said mold neck portion and interposed between said mold and seat.

11. A mold holder assembly for detachably securing interchangeable molds comprising a block-body having a top surface and a bottom surface, a plurality of mold-receiving bores each extending through said body and through both of said surfaces, said top surface having a radially inwardly extending portion overlying each bore and providing therein a mold seat having a diametrically reduced opening therethrough, an interchangeable spacer ring loosely engaged against said seat in surrounding relation to the opening for interposition between said seat and a received mold, and an adjustable fastener engaged with said body and projecting therebelow for engagement with a received mold for an upward movement thereof into seating engagement with said seat.

12. A mold holder assembly for detachably securing interchangeable molds comprising a block-like body having a top surface and a bottom surface, a plurality of bores extending through said body and through both of said surfaces for reception of the molds therein, said top surface having a radially inwardly extending portion overlying each bore and providing therein a mold accommodating seat having a diametrically reduced opening therethrough, a fastener associated with each of said bores, said fastener comprising at least one elongated bolt extending through said block-like body adjacent the bore, the lower end of said bolt projecting below said bottom surface, a retainer received over the projecting lower portion of said bolt, said retainer having a portion thereof projecting inwardly across said bore for engagement with a received mold, and means adjustably affixed to said bolt below said retaining means for a locking of said retaining means on said bolt in a vertically adjusted position.

References Cited by the Examiner
UNITED STATES PATENTS

| | | | |
|---|---|---|---|
| 923,585 | 6/1919 | Schacht | 18—42 |
| 1,873,081 | 8/1932 | Von Witzki | 249—120 X |

FOREIGN PATENTS

| | | |
|---|---|---|
| 972,719 | 2/1951 | France. |

J. SPENCER OVERHOLSER, *Primary Examiner.*

E. MAR, *Assistant Examiner.*